June 18, 1935.    W. H. BRESNAHAN    2,005,608
APPARATUS FOR USE IN MAKING FOOTWEAR
Filed Oct. 5, 1923    5 Sheets-Sheet 3

Inventor:
William H. Bresnahan
By Roberts, Cushman & Woodberry
Att'ys.

June 18, 1935.　　W. H. BRESNAHAN　　2,005,608
APPARATUS FOR USE IN MAKING FOOTWEAR
Filed Oct. 5, 1923　　5 Sheets-Sheet 4

June 18, 1935. W. H. BRESNAHAN 2,005,608
APPARATUS FOR USE IN MAKING FOOTWEAR
Filed Oct. 5, 1923  5 Sheets-Sheet 5

Inventor
William H. Bresnahan
by Roberts, Cushman, & Woodberry.
Attorneys.

Patented June 18, 1935

2,005,608

UNITED STATES PATENT OFFICE 2,005,608

APPARATUS FOR USE IN MAKING FOOTWEAR

William H. Bresnahan, Lynn, Mass., assignor, by mesne assignments, to Compo Shoe Machinery Corporation, New York, N. Y., a corporation of Delaware Application October 5, 1928, Serial No. 310,594

38 Claims. (Cl. 12—36)

This invention pertains to the manufacture of footwear of that type in which the outer sole is permanently secured in place by means of adhesive cement rather than by the use of nails, tacks, pegs, staples, stitches or similar fasteners and also to a method of and apparatus for use in making footwear.

The present application is a continuation in part of my copending application Serial No. 272,449 filed April 24, 1928. In such copending application I have disclosed one desirable method and an apparatus for use in the practice thereof. In said application I described some of the advantages to be derived from the use of independent molds each adapted to receive a shoe and to maintain the shoe and sole under pressure while the cement is setting or hardening. Among such advantages may be mentioned rapidity of operation, permissible variation in the number of operators employed at any one time, ready accommodation to change in volume of work, economy in floor space, and adaptability to existing systems of manufacture.

In my aforesaid application I described broadly the employment of individual molds and the use of conveyor means therein specifically described as wheeled racks or a moving conveyor for receiving the filled molds and for retaining them during the setting of the cement, suitable auxiliary devices such as mold positioning means at the loading and unloading stations also being described therein.

While the wheeled racks described in my aforesaid application as constituting a conveying and storing means are very useful and wholly practical for the purpose, I contemplate that under certain conditions and particularly in factories where shoes are transported from one operating position to another by other means than the usual wheeled racks, it may be desirable to employ a method and apparatus somewhat different from that of my aforesaid application.

The present invention provides such a method and apparatus which is independent of the use of wheeled racks or other similar containers, although providing substantially the same flexibility of operation and adaptation to variations in working conditions as are furnished by the method and apparatus of my prior application. In addition my present invention, at least in some of its applications, relieves the operator of the labor of lifting the molds as well as the work of moving wheeled racks or similar containers from place to place by hand. The present invention also includes improvements in the mold proper, providing easier and more rapid adjustment of the parts and a sole supporting surface of improved construction and increased durability.

In accordance with the present invention I provide an improved type of mold which is adapted to facilitate the insertion and removal of shoes and thus to increase the productive capacity of the apparatus.

An object of the invention, therefore, is to provide a method and apparatus by which outer soles may be permanently and adhesively affixed to lasted uppers in a convenient, efficient and economical manner, the apparatus being so constructed as to occupy a minimum of floor space and to present the molds successively to the operator after each shoe has been held for a definite period of time therein sufficient to allow the adhesive to set properly.

A more particular object of the invention is to provide a flexible conveyor on which a plurality of individual molds are mounted and which is intermittently driven so as to carry the molds successively about a substantially rectilinear path, said molds being provided with means for clamping a shoe against a pad and said apparatus being provided with means for increasing the pressure between the pad and the shoe of each mold, as the mold is positioned at a given point in the path.

In the accompanying drawings I have illustrated by way of example certain steps employed in my new method and have also indicated in a more or less diagrammatic manner apparatus useful for performing such method, but I wish it to be understood that these drawings are by way of example only and that the invention is not necessarily limited to the precise order of steps here specifically disclosed or to the mechanism illustrated but that the invention is of broad application and capable of many variations.

In the accompanying drawings.

In the ordinary practice of the present invention, I utilize a large number of individual molds 1, each of substantially the same construction, although they may be made in different sizes if desired to accommodate shoes of various sizes, for example, children's shoes and men's shoes. Each mold preferably comprises a hollow base member 2 having a depression 3 shaped to receive an impervious inflatable bag or sack 4 which is generally shaped to conform to the bottom of a shoe. Sack 4 is covered by a casing 5, over which is disposed a conforming cushion 5', which may be made of one or more sheets of more or less flexible material, such as leather, and which is approximately co-extensive with the upper surface of sack 4. This cushion 5' is fastened to the base member 2 by means of relatively narrow end tabs 5'', which preferably have apertures therein through which pass screw-threaded posts 20 and 26, which will be hereinafter described in detail. These posts may thus serve, among other purposes, to hold in position tabs 5'', which may be further secured beneath end flange members 2', which together with a pair of side flange members 2'' are fastened to base member 2 so as to project slightly over the depression 3 and sack 4 to prevent excessive rolling of the edges of the sole. The margins of conforming cushion 5' extend beneath flanges 2' and 2'', but are free with respect to the base member except at the tab portions 5''. A suitable valved inlet 7 is connected to the sack 4, projecting outwardly beyond the end of the base and having a valve of automatic type similar to that ordinarily used in pneumatic tires; and outlet pipe 10 is also connected to the sack 4, projecting from the end of the base 1 opposite to that from which the valve 7 extends. Pipe 10 preferably is provided with a plunger 12 which controls a suitable valve within the pipe so that the inward movement of the plunger is effective in permitting fluid to be exhausted from sack 4. A depending metal guard 15 may be arranged about the end of the plunger 12 to prevent accidental engagement with the same and also constituting a convenient handle. A screw-threaded post 20 is secured to the base 1 and is provided with a bifurcated extension 41 to which a lever arm 22 is pivotally connected by the pin 23. A suitable stop 24 is adapted to limit the movement of the pressure applying lever arm 22. A threaded post 26 is secured to the opposite end of the base 1, having a bolt 27 pivotally connected thereto, this bolt carrying a thumb nut 28 having a boss 30 with nubs 31, the latter being engageable in depressions 32 in the split end 33 of pressure lever 22, so that the thumb screw may be tightened down to move the arm 22 downwardly toward the sack 4. A nut 35 may be arranged upon bolt 27 to form an adjustable stop to limit the downward movement of the split end of the pressure arm. A presser element 40 is preferably arranged to be longitudinally adjustable along the arm 22, being provided with outwardly and downwardly curved arms 42 (Fig. 2) which ordinarily are covered with suitable padding 43 and are adapted to engage the toe portion of the shoe to press the same downwardly against the sack. In order to permit the convenient longitudinal adjustment of presser element 40, it is provided with a suitable recess 45 containing a spring pressed plunger 46 which has a rounded end portion adapted to engage any one of a series of depressions 47 upon the lower edge of the arm 22. The upper end of the presser element 40 is provided with a vertically elongate slot through which the pressure arm extends. A corresponding presser element 50 is adjustably mounted near the outer end of the arm, this element being provided with a suitable depending pin 51 that is adapted to engage a socket 52 in a last 53.

Figure 1:
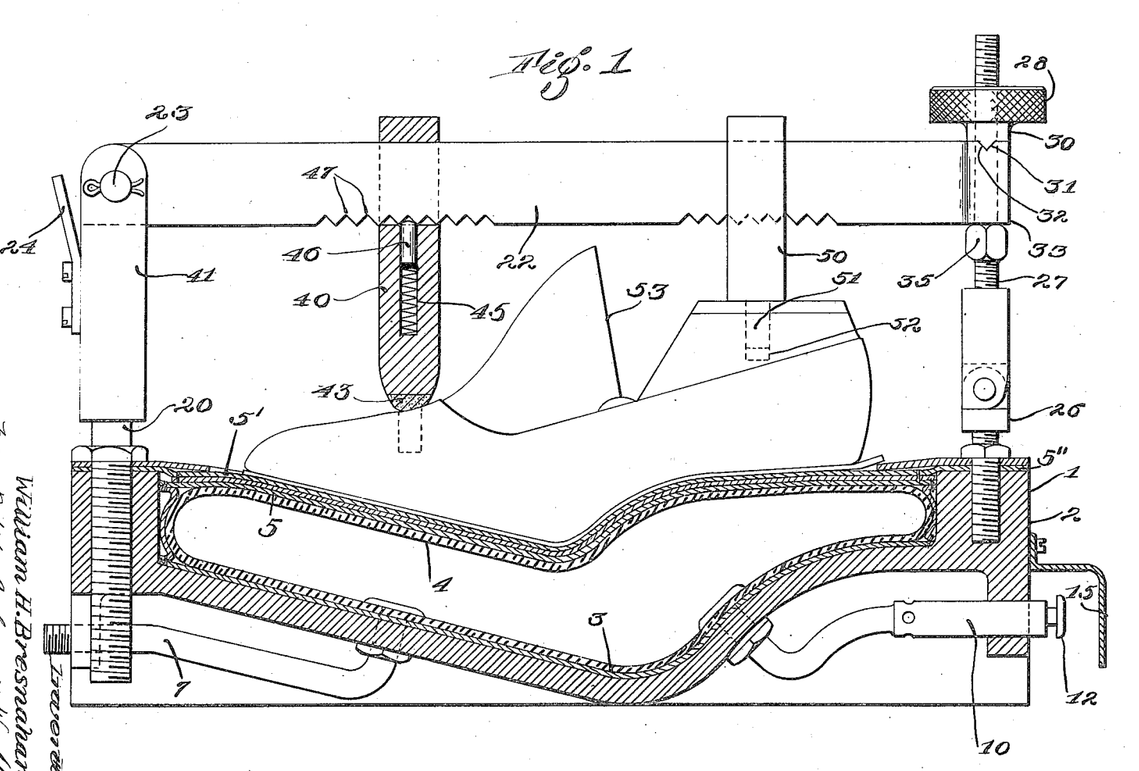
Fig. 1 is a central sectional view through a typical mold constructed in accordance with the present invention, showing a last and shoe located in the mold.

In the use of an individual mold of this character an insole is first assembled with a shoe upon a last. The sole and if desired, the insole are suitably coated with adhesive and arranged in proper relation to each other within the mold with the element 50 engaging the socket 53 in the last. The pressure arm 22 is then swung downwardly against the upper face of the leather covering 5' of sack 4, and the thumb screw 28 is tightened in order to press the sole firmly against the covering of the sack. The sack is then inflated, preferably by bringing the end of valve element 7 into engagement with a suitable source of pneumatic pressure. The yieldability of the inflated sack permits it readily to conform to the particular configuration of the individual shoe bottom and to cooperate with the press arm in firmly holding the adhesively coated surfaces together until the agglutinant sets. After the cementitious material has thus had an opportunity to set, the plunger 12 is pressed inwardly to deflate the sack 4 and the thumb screw 28 is loosened to permit the arm 22 to be swung upwardly and the last to be removed from the pin 51.

Figure 2:
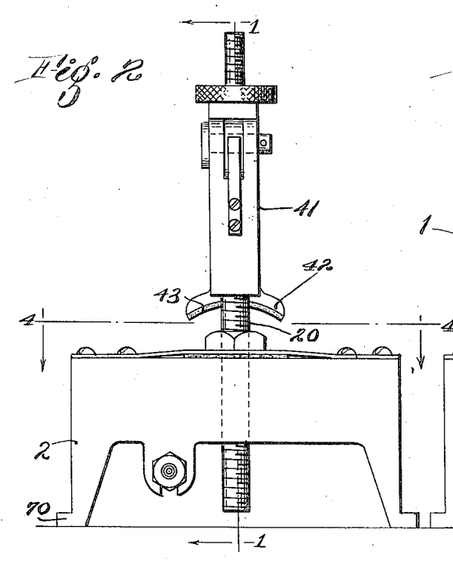
Fig. 2 is an end elevation of the mold to smaller scale.
Figure 3:
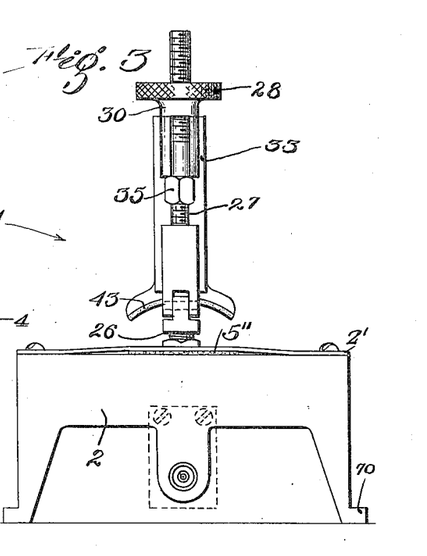
Fig. 3 is an elevational view of the opposite end of the same.
Figure 4:
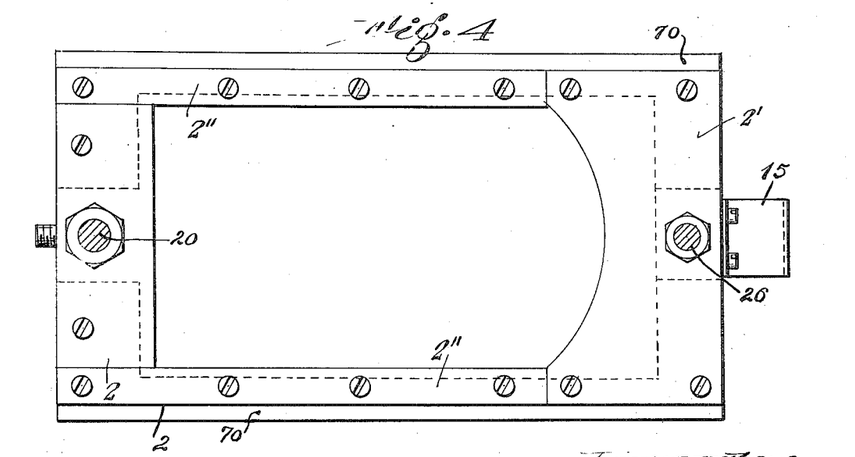
Fig. 4 is a section on line 4—4 of Fig. 2.
Figure 5:
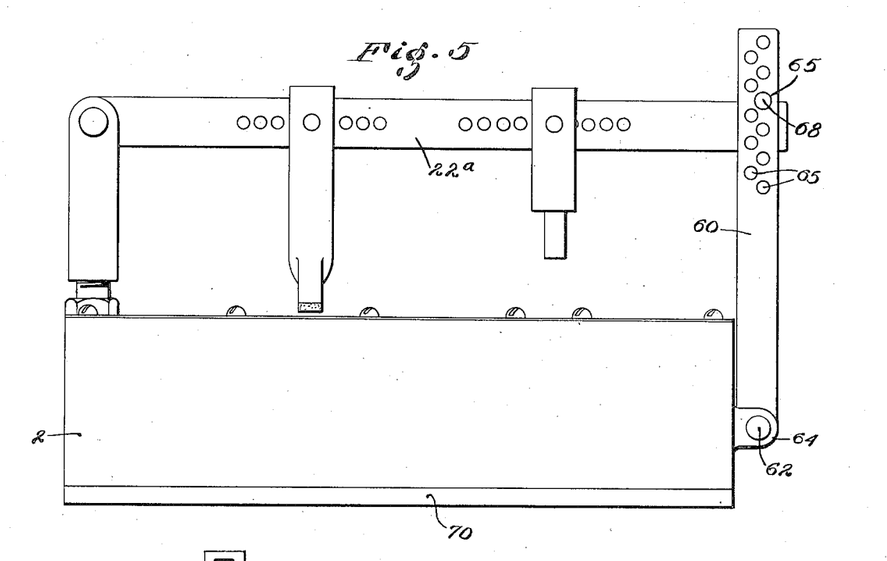
Fig. 5 is a side elevational view of another type of mold.
Figures 6, 7, 16:
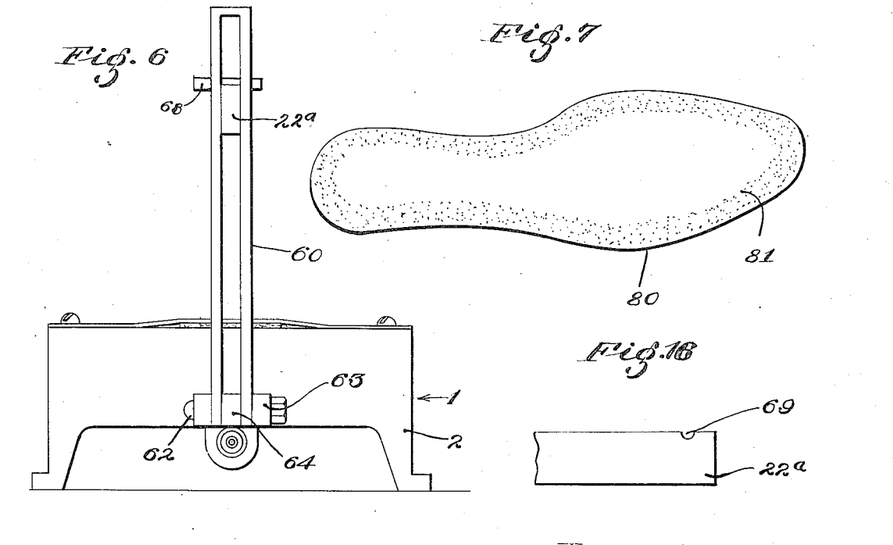
Fig. 6 is an end elevation of the same.
Fig. 7 is a more or less diagrammatic view showing the preferred disposition of agglutinant upon the sole and/or insole.
Fig. 16 is an elevational detail of a portion of the mold shown in Fig. 5.

Figs. 5 and 6 illustrate an optional and in fact a preferred arrangement for locking the end of the pressure lever 22ª down in operative position. As shown in Figs. 5 and 6, a suitable link 60 may be pivotally mounted upon the end of base 1, this link preferably being in the form of a bail having parallel legs adapted to receive a transverse pin 62 the ends of which are mounted in outstanding lugs 63 upon the base 1. If desired, a suitable spacer 64 may be arranged upon the pin between the ends of the bail legs. A plurality of aligned openings 65 is provided in the sides of the upper end of member 60, being adapted selectively to receive a transverse pin 68. The latter is engageable in a recess 69 (Fig. 16) in the edge of the outer end of pressure lever 22ª, it being evident that the selective positioning of the pin 68 determines the amount of downward pressure exerted by the link upon the pressure lever, the yieldability of the sack, particularly when the same is uninflated, permitting the ready locking of the pin in engagement with the recess. This arrangement is advantageous, since, if shoes of a standardized size with standardized lasts are being produced, the pressure lever may be locked in operative position very quickly, while the fastening means shown in Figs. 1, 2 and 3 is advantageous when the position of the pressure lever must be constantly varied to conform to shoe lasts of various sizes.

Preferably the bases 1 of the molds may be provided with lateral flanges 70 that are adapted to be received in suitable guide elements upon benches, conveyors, racks, or the like upon which the molds are to be supported.

In making shoes of the type hereinabove referred to and with molds of the character described above it is highly advantageous to confine the agglutinant merely to the marginal portions of the sole and insole, such an arrangement being diagrammatically indicated in Fig. 7, wherein the sole is designated by numeral 80 and the dotted marginal portion of the same designated by numeral 81 indicates the adhesive applied thereto. When the adhesive is thus confined to the outer portion of the sole and/or insole, the finished shoe may flex more readily and lacks the stiffness that is sometimes characteristic of a shoe having the entire juxtaposed surfaces of the sole and insole coated with adhesive.

In order to permit economical production of shoes by the use of molds of the character disclosed herein, it is desirable to convey the molds to the operator as rapidly as he is able to fill successive molds; to move the filled molds away from the operator; to support the molds until the adhesive has set; and then to bring the filled molds to another operator who removes the shoes from the molds. The apparatus shown in Figs. 8 and 9, for example, may be utilized for this purpose. As therein shown I may provide a conveyor belt 100, the upper run of which is supported on suitable rolls 101. The belt is preferably provided with pairs of cleats 102 which are shaped and positioned to engage the lateral flanges 70 upon the bases of the molds 1. It is thus evident that successive molds may be brought into engagement with the conveyor belt by moving the same laterally into engagement with the elements 102.

Figure 9:
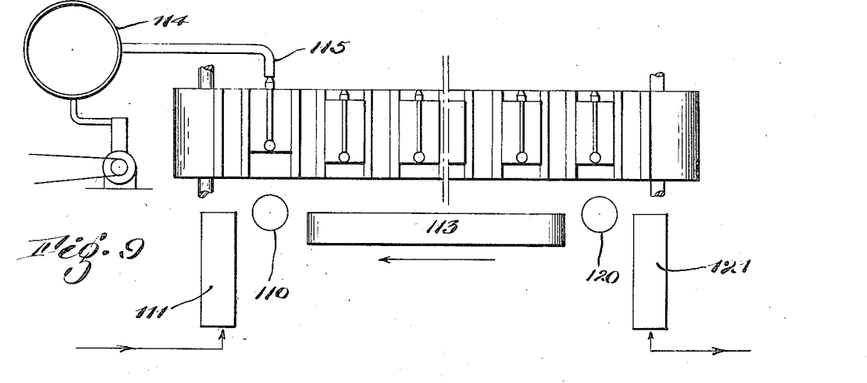
Fig. 9 is a top view, more or less schematic in character, of the arrangement shown in Fig. 8.

Preferably the conveyor belt, as shown in this embodiment of the invention, may be given an intermittent movement by a suitable Geneva mechanism or its equivalent, designated by numeral 108, this mechanism being so timed that the belt will be held stationary for a sufficient period to permit the filling of successive molds by the operator who is located at the station 110, Fig. 9. A suitable rack or conveyor mechanism 111 may supply the lasted shoes to this operator, and a suitable conveyor mechanism or the equivalent 113 may supply the empty molds to the operator. The operator then places successive molds upon the belt, properly securing a shoe in each mold before the mold is carried onwardly by the belt. A suitable source of air pressure 114 is arranged to supply air by means of a pipe 115 to the molds. Thus the end of pipe 115 may be so positioned that the operator may slide the filled mold transversely of the belt to bring the automatic air valve into engagement with the air supply pipe, the latter also having a control valve of automatic or other type. As soon as the mold is inflated it is pulled back to the central part of the belt. Thus the operator may fill and inflate a single mold during each cessation in movement of the conveyor belt, and substantially as soon as the mold is properly filled and inflated the mechanism 108 will be effective in moving the belt to present a succeeding pair of cleats before the operator whereupon another mold is positioned, filled and inflated. The belt 100 is preferably of such a length that the molds remain thereon for a sufficient length of time to permit the agglutinant substantially to set. An operator at the station 120 near the end of the conveyor belt toward which the molds are moving, removes the shoes from successive molds, takes the molds from belt 100, and places them upon the conveyor belt 113 which returns them to operator 110, while the shoes are placed upon a suitable rack or the equivalent 121. The speed of the conveyor mechanism is so determined that the time of the operator 110 is substantially occupied by mounting and filling successive molds on the conveyor and the length of the conveyor mechanism is so determined in relation to its speed that the agglutinant will substantially have set by the time the molds reach the end of the belt.

Figure 8:
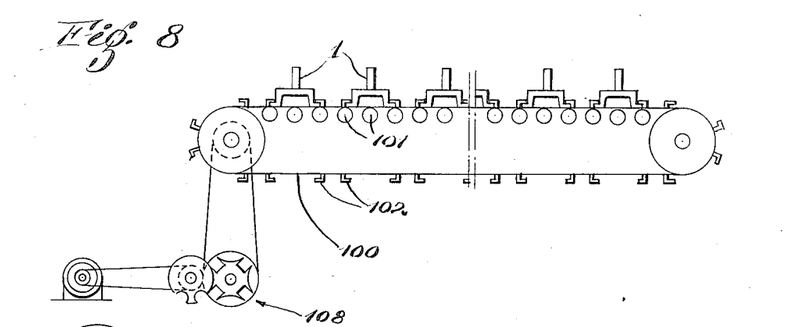
Fig. 8 is a diagrammatic view of one type of apparatus utilized in the manufacture of shoes in accordance with the present invention.
Figure 10:
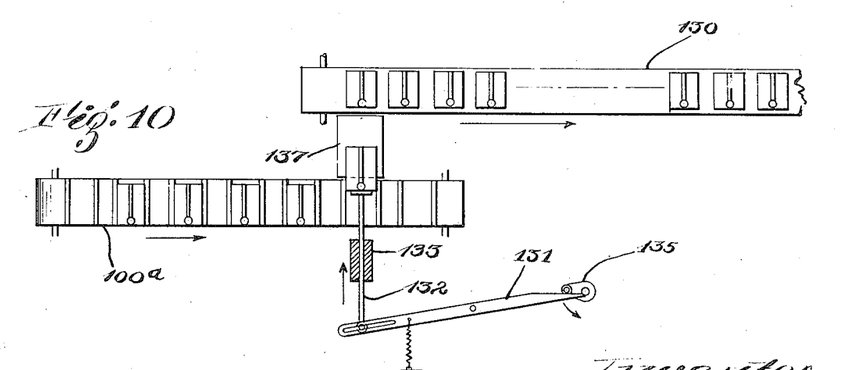
Fig. 10 is a diagrammatic view of another form of apparatus utilized in carrying out the present invention.

Fig. 10 illustrates a further development of the arrangement shown in Fig. 8. The belt 100$^a$ may correspond in general to the belt 100, and may be similarly driven by an intermittent driving mechanism, but the length of the belt 100$^a$ is preferably restricted and a suitable storage belt 130 is arranged to receive the filled molds from the first belt. Belt 130 preferably is positioned in such a way that it does not occupy valuable room in the manufacturing establishment, for example being suspended from the ceiling or the like. In order to transfer the filled molds from the belt 100$^a$ to belt 130, I provide a pivoted lever 131. This lever has one end connected by a suitable slot and pin arrangement to a plunger 132 that reciprocates in a guide 133, while the opposite end of the lever is engageable by a suitable crank or cam member 135 that is adapted intermittently to reciprocate the plunger in synchronism with the movement of the belt 100$^a$ so that the plunger may engage successive molds and push the same laterally off the belt 100$^a$ over a suitable intermediate surface or bench 137 onto the belt 130. Obviously the latter need not be equipped with cleats to receive the molds since the accurate positioning of the molds during this portion of the operation is not essential, and this belt preferably moves constantly but at a slower speed than belt 100$^a$.

Figure 11:
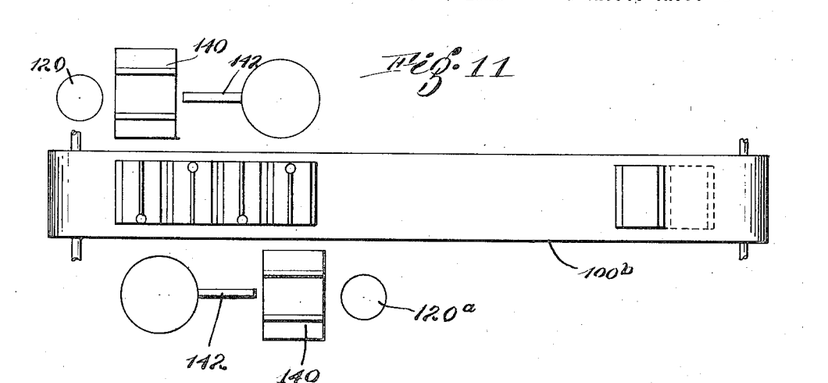
Figs. 11 and 12 are similar views of still further embodiments of the invention.

Fig. 11 illustrates a further variation of the invention. According to this arrangement, one or more operators at stations 120 and 120$^a$ may be located adjacent to the belt 100$^b$, being provided with benches 140 to which the empty molds and shoes may be supplied by racks or conveyor mechanism (not shown). A suitable source of pneumatic pressure 142 is arranged adjoining each bench 140, the latter being positioned so that the inflated molds may be moved from the same onto the belt 100$^b$. As shown in Fig. 11, the two operators may be located in staggered positions upon opposite sides of the belt so that the molds may be concomitantly supplied to the belt by the two operators and the speed of production accordingly increased. Ordinarily it will require a somewhat longer time for a workman properly to locate a shoe within the mold and to inflate the latter than it will for a workman to remove the shoe from the mold. Accordingly two workmen may be disposed as shown adjoining the mold receiving end of the belt, while one workman may be sufficient to remove the molds from the same.

Figures 12, 13, 14, 15:
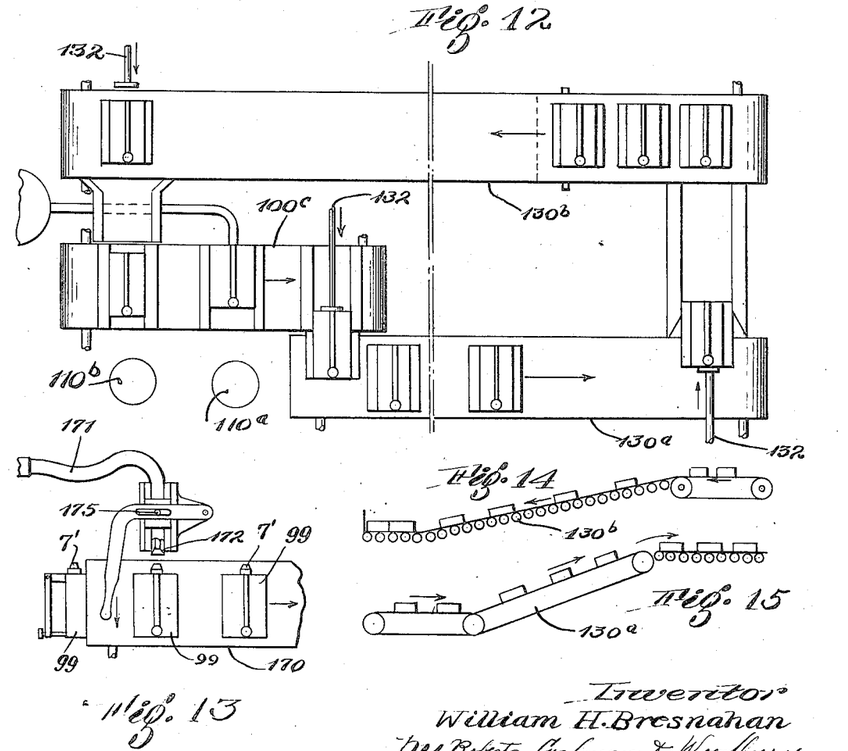
Fig. 13 is a diagrammatic view showing yet another embodiment of the invention including optional means for inflating the molds.
Figs. 14 and 15 are side elevational views, diagrammatic in character, of portions of the assembly shown in Fig. 12.

Figs. 12, 14 and 15 show an arrangement similar to those previously described but particularly designed to afford economy in space occupied.

In accordance with this arrangement, an operator may be located at 110ᵃ beside the belt 100ᶜ while mechanism similar to that shown in Fig. 10, including a plunger 132 may be arranged to move the filled molds from the belt 100ᶜ to a conveyor belt 130ᵃ. As shown in Fig. 14 this conveyor mechanism may be inclined upwardly and continued at a higher elevation, i. e. adjoining the ceiling of the factory, so that space is thereby conserved. A second transfer mechanism, including a plunger 132, is preferably arranged to move the conveyors from the belt 130ᵃ to a belt 130ᵇ which moves in a direction opposite to that of the belt 130ᵃ, the means 130ᵇ being shown in Fig. 14. The end of conveyor means 130ᵇ preferably is arranged beside the end of belt 100ᶜ and a transfer mechanism, also including a plunger 132, is arranged to transfer the molds from the conveyor 130ᵇ to the belt 100ᶜ, an operator being located at the point 110ᵇ beside belt 100ᶜ to remove the shoes from the molds so that the empty molds may remain on this belt and continue onwardly to station 110ᵃ where the operation is repeated. It is evident that the arrangement shown in Fig. 12 permits a conservation of space and does not necessitate the removal of the molds from the conveyor mechanism at any time, the molds in each case following a continuous circuit and being in use substantially the entire time.

Fig. 13 illustrates a modified arrangement for inflating the molds upon a conveyor belt 170, which, like that shown in Figs. 8, 11 and elsewhere herein, is mounted for movement about a pair of spaced rotatable drums or the like, only the left end portion of the conveyor being shown in Fig. 13. This movement is intermittently applied to the conveyor belt by means of some suitable driving means, in order successively to present the molds 99 opposite an inflating station. These molds 99 may be constructed substantially in accordance with those shown in Figs. 1 and 5, and in the present form of the invention, are attached to the conveyor belt for movement therewith about both its upper and lower runs or traverses, the press 99 at the extreme left end of the belt being shown leaving its lower and approaching its upper traverse. The mentioned inflating station is provided with a suitable arrangement for contacting and inflating the valve 7' of each mold 99 as it pauses in opposed relation thereto. This arrangement comprises a flexible duct 171 connected to a suitable nozzle 172 that is adapted to engage the automatic valve at the end of a mold 99. A suitable lever is pivotally connected to the nozzle 172 as designated by numeral 175 so that the lever may be operated to move the nozzle into engagement with the automatic valve, thus avoiding the necessity of sliding the comparatively heavy molds transversely in order to bring the same into engagement with a fixed air supply pipe. This arrangement of the conveyor belt and molds possesses advantages of the arrangement shown in Fig. 12 in that it enables the molds to follow a continuous circuit, which circuit, in accordance with the teaching of this invention is desirably sufficiently long to permit the agglutinant to set between successive arrivals of the press at the inflating station when the belt is advanced sufficiently rapidly to keep an operator at such station constantly busy.

It is evident that the present invention provides molds adapted to permit the rapid application of pressure to the shoe soles and provides a method and apparatus insuring the maximum of production with a given number of workmen. Further, it will be understood that certain of the features of the present invention may be utilized in connection with various types of presses used in the manufacture and repair of footwear, as well as with various types of press carriers heretofore suggested for use in machines of the multiple press type, and various mechanisms for advancing the carrier. Therefore, it is for reasons of convenience and simplicity that the illustrated embodiment of the invention has been confined to preferred types of pressure molds and mold conveying means. It is to be understood, however, that the invention is not limited to these features or to the use in sole-affixing machines as distinguished from sole-laying or sole-leveling machines, and since certain changes may be made in the above construction and different embodiments of the invention can be made without departing from the scope thereof, it is intended that all matter contained in the above description or shown in the accompanying drawings shall be interpreted as illustrative and not in a limiting sense.

I claim:

1. Apparatus of the class described comprising, in combination, a mold having an inflatable pressure-applying pad, means for clamping a shoe against the pad, means for supporting the mold and for causing the mold to move in a substantially rectilinear path, means for intermittently interrupting the movement of said last mentioned means, and means for increasing the pressure between the pad and the shoe during such interruption.

2. Apparatus of the class described comprising, in combination, a plurality of molds, each having an inflatable pressure-applying pad, means for clamping a shoe against the pad, and an endless flexible conveyor for supporting said molds, means for intermittently moving the conveyor, and means operable during periods between movement of said conveyor to deliver compressed air to molds carried by the conveyor.

3. In combination a belt type conveyor, a series of inflatable molds, and means upon the conveyor and molds respectively designed to permit the latter to be locked with the former, but to be readily movable out of locked position.

4. In combination a belt type conveyor, a series of inflatable molds, and means upon the conveyor and molds respectively designed to permit the latter to be slid transversely into and out of interlocking engagement with the former from one side at least of the path of conveyor movement.

5. In combination a belt type conveyor, a series of inflatable molds, and means upon the conveyor and molds respectively designed to permit the latter to be slid transversely into and out of interlocking engagement with the former from either side of the path of conveyor movement, and mold inflating means arranged beside the conveyor, said means being adapted automatically to inflate a mold when the latter is slid transversely of the conveyor into engagement with said means.

6. A mold of the class described comprising, in combination, a base, an inflatable sack therein, a pressure arm pivotally mounted above the base, means for holding said arm in position to clamp a shoe against said pad, a presser element adjustable along said arm, the latter having a plurality of downwardly depending notches, and a detent carried by the presser element yieldably urged into engagement with one of said notches.

7. Apparatus of the class described comprising, in combination, a plurality of molds, each having a pressure-applying pad provided with an inlet valve and means for clamping a shoe against said pad, an endless flexible conveyor for supporting said molds, a fluid pressure supply source adjacent said conveyor, means for intermittently moving said conveyor to position the molds adjacent said fluid pressure supply source, and means for contacting said source with the inlet valve of the adjacent mold to deliver pressure to the pad thereof.

8. Apparatus of the class described comprising, in combination, a plurality of molds, each having a pressure-applying pad provided with an inlet valve and means for clamping a shoe against said pad, an endless flexible conveyor for supporting said molds, a fluid pressure supply source adjacent said conveyor, means for intermittently moving said conveyor to position successively the molds adjacent said fluid pressure supply source, and means for moving the inlet valve of the adjacent mold into contact with said source to deliver pressure to the pad thereof.

9. Apparatus of the class described comprising, in combination, a plurality of molds, each having a pressure-applying pad provided with an inlet valve and means for clamping a shoe against said pad, an endless flexible conveyor for supporting said molds, a fluid pressure supply source adjacent said conveyor, means for intermittently moving said conveyor to carry said molds past said fluid pressure supply source, and means for moving said source into contact with the inlet valve of the molds as they are carried by to deliver pressure to the pad thereof.

10. Apparatus of the class described comprising, in combination, a plurality of molds, each having a pressure-applying pad, means for clamping a shoe against the pad, and an endless flexible conveyor for supporting said molds, means for moving the conveyor, and means operative as each mold passes a point of the conveyor traverse to increase the pressure of the pad against which a shoe is clamped.

11. Apparatus of the class described comprising, in combination, a plurality of molds, each having a flexible pad, means for clamping a shoe against the pad, an endless flexible conveyor for supporting said molds, means for moving the conveyor, and means operative as each mold passes a point of the conveyor traverse to increase the pressure between the pad and the shoe.

12. Apparatus of the class described comprising, in combination, a plurality of molds, each having a flexible pad, means for clamping a shoe against the pad, an endless flexible conveyor for supporting said molds, means for intermittently moving the conveyor, and means operative at a point in the conveyor traverse to increase the pressure between the pad and the shoe as the mold is located opposite said point and between movements of the conveyor.

13. A shoe press adapted for adhesively affixing an outer sole to a lasted shoe upper, including in combination, a base member provided with a cavity in its top, a pad disposed within said cavity, flange members on the sides and ends of said base member and extending marginally over said cavity and said pad, and a conforming cushion secured under the end flange members and extending over said pad, the side edges of said conforming cushion being free with respect to the sides of said base member.

14. A shoe press adapted for adhesively affixing an outer sole to a lasted shoe upper, including, in combination, a base member provided with a cavity in its top, an inflatable pad disposed within said cavity, flange members on the sides and ends of said base member and extending marginally over said cavity and said pad, and a conforming cushion secured under the end flange members and extending over said pad, the side edges of said conforming cushion being free with respect to the sides of said base member.

15. A shoe press adapted for adhesively affixing an outer sole to a lasted upper, including, in combination, a base member provided with a cavity in its top, an inflatable pad encased in an inextensible covering disposed in said cavity, flange members on the sides and ends of said base member and extending marginally over said cavity and said pad, and a conforming cushion secured under the end flange members and extending over said pad, the side edges and an appreciable part of the end edges of said conforming cushion being free with respect to the base member.

16. A shoe press adapted for adhesively affixing an outer sole to a lasted upper, including, in combination, a base, an inflatable pad encased in an inextensible covering disposed on said base, and a conforming cushion extending over said pad and secured at its ends, only, to said base member.

17. A machine of the character described, comprising, a stand arranged in a work-receiving position, a carrier mounted for movement with respect to said stand, and a work support mounted in work-setting position on said carrier and for movement thereon adjacent said stand, said work support having means thereon for sustaining a shoe and its sole in cooperative setting relation.

18. A machine of the character described, comprising, operating mechanism, a carrier arranged for movement relative to said mechanism, and a work support mounted on said carrier for movement relative thereto into position to cooperate with said mechanism, said work support having means thereon for sustaining a shoe and its sole in cooperative setting relation.

19. A machine of the character described, comprising, operating mechanism, a carrier arranged for movement relative to said mechanism, means for moving said carrier, a work support mounted for relative movement on said carrier, said work support having means thereon for sustaining a shoe and its sole in cooperative setting relation and means for stopping said carrier with said support adjacent said operating mechanism.

20. A machine of the character described, comprising, a carrier arranged for movement relative to a station, means for moving said carrier, a shoe support mounted on said carrier, a sole-engaging pad on said support, means for effecting release of said pad, and means for moving said support on said carrier adjacent said station.

21. A machine of the character described, comprising, a carrier arranged for movement relative to a station, a work support mounted for relative movement on said carrier and to a position adjacent said station, an inflatable work-engaging pad on said support adapted to maintain a shoe and its sole in cooperative setting relation thereon, and means at said station adapted to control the inflation of said pad.

22. A machine of the character described, comprising, a carrier, and a work support mounted on said carrier and having means for sustaining a shoe and its sole in cooperative setting relation, said work support and said means being movable as a unit relative to said carrier between work-receiving and work-setting positions.

23. A machine of the character described, comprising, a movable carrier, a work-support mounted on said carrier for movement between work-receiving and work-setting positions, and means for sustaining a shoe and its sole in cooperative setting relation on said support, and means for moving said support and sustaining means as a unit relative to said carrier.

24. Sole pressing apparatus comprising a plurality of presses each having shoe supporting means and an inflatable pad, means including flexible conveyor means permitting movement of said presses in an endless path, and means located adjacent said path for inflating each press at a determined portion of said path.

25. Sole pressing apparatus comprising a plurality of presses each having shoe supporting means and a pressure pad, means including flexible conveyor means for permitting movement of said presses in an endless path, and means located at a determined portion of said path for increasing the pressure between the pad and shoe of each press.

26. Sole pressing apparatus comprising a plurality of presses each having shoe supporting means and an inflatable pad, means including flexible conveyor means for permitting movement of said presses in an endless path, said path having a loading station at one portion thereof, air supply means for said pads at said station, and means for permitting relative movement between said supply means and a press at said station to bring such parts into pad inflating communication.

27. Sole pressing apparatus comprising a plurality of presses each having shoe supporting means and a pressure pad, elongate conveyor means on which said presses are mounted, means for moving said conveyor means in a path including a rectilinear traverse, said path having a loading station at one portion thereof, and means at said station for increasing the pressure between a pressure pad and a shoe, the path of said conveyor means being sufficiently long to enable work in each press to set between successive arrivals of such press at the loading station.

28. Sole pressing apparatus comprising an elongate conveyor including a substantially rectilinear traverse, a press mounted on said conveyor having shoe supporting means and a pressure pad, said conveyor having a loading station along its traverse, means at said station for increasing the pressure between said pad and a shoe, and means for moving said conveyor, said conveyor being of sufficient length to enable work in said press substantially to set by the time it completes its movement therealong.

29. Sole pressing apparatus comprising a plurality of presses each having shoe supporting means and an inflatable pad, flexible conveyor means for moving said presses in an endless path, and means located adjacent said path for inflating each press at a determined portion of said path.

30. Sole pressing apparatus comprising a plurality of presses each having shoe supporting means and a pressure pad, flexible conveyor means for moving said presses in an endless path, and means located at a determined portion of said path for increasing the pressure between the pad and shoe of each press.

31. Sole pressing apparatus comprising a plurality of presses each having shoe supporting means and an inflatable pad, flexible conveyor means for moving said presses in an endless path, said path having a loading station at one portion thereof, air supply means for said pads at said station, and means for effecting relative movement between said supply means and a press at said station to bring such parts into pad inflating communication.

32. Sole pressing apparatus comprising a plurality of presses each having shoe supporting means and a pressure pad, elongate conveyor means on which said presses are mounted, said conveyor means being movable in an endless path having an inflating station at one portion thereof, and means at said station for increasing the pressure between a pressure pad and a shoe, the path of said conveyor means being sufficiently long to enable work in each press substantially to set between successive arrivals of such press at the loading station.

33. In a sole pressing machine, a pair of spaced rotatable elements, an intermittently movable endless carrier passing around said elements, said carrier having a plurality of pressing means movable therewith in an endless path, each pressing means including supporting means and a pressure pad adapted to clamp a shoe therebetween, and means for increasing the pressure between the pad and shoe of one of said pressing means while said carrier is stopped between its intermittent movements.

34. In a sole pressing machine, a pair of spaced rotatable elements, a flexible endless carrier passing around said elements, said carrier having a plurality of pressing means movable therewith in an endless path, each pressing means including shoe supporting means and an inflatable pad, said carrier having an inflating station along its traverse, means for moving said carrier successively to present said pressing means at such station, and mean for effecting inflation of each pressing means while at the station.

35. In a sole pressing machine, an endless flexible carrier forming spaced upper and lower traverses, said carrier having a plurality of shoe pressing means movable around said traverses in an endless path, each pressing means including shoe supporting means and an inflatable pad, means for moving said carrier, and means permitting inflation of each pad at a given portion of said carrier path.

36. A sole affixing machine for affixing outer soles to uppers by means of cement comprising a pair of spaced rotatable elements, a flexible endless carrier passing around said elements, said carrier having a plurality of pressing means movable therewith in an endless path and having sufficient length to enable the cement to set in a given press during a single traverse about the endless carrier, each pressing means including supporting means and a pressure pad adapted to clamp a shoe therebetween, means for moving said carrier, and means for increasing the pressure between the pad and shoe of each pressing means at a given portion of the carrier path.

37. A sole pressing machine comprising an elongate flexible conveyor forming a continuous traverse, a plurality of presses attached thereto for movement therewith, each of said presses having shoe supporting means and an inflatable pad, air supply means at a determined portion of said conveyor traverse, said conveyor being movable successively to locate each of said presses opposite said air supply means, and means for bringing said air supply means into inflating relation with each of said presses.

38. A sole pressing machine comprising an elongate flexible conveyor forming a continuous traverse, a plurality of presses attached thereto for movement therewith, each of said presses having shoe supporting means and an inflatable pad, an air supply chuck adjacent said conveyor, and means for advancing said chuck into communication with an adjacent pad.

WILLIAM H. BRESNAHAN.